Feb. 24. 1925.  
F. MOESCHL ET AL  
1,527,693  
MACHINE FOR CASTELLATING NUTS  
Filed Dec. 8, 1921  
15 Sheets-Sheet 1
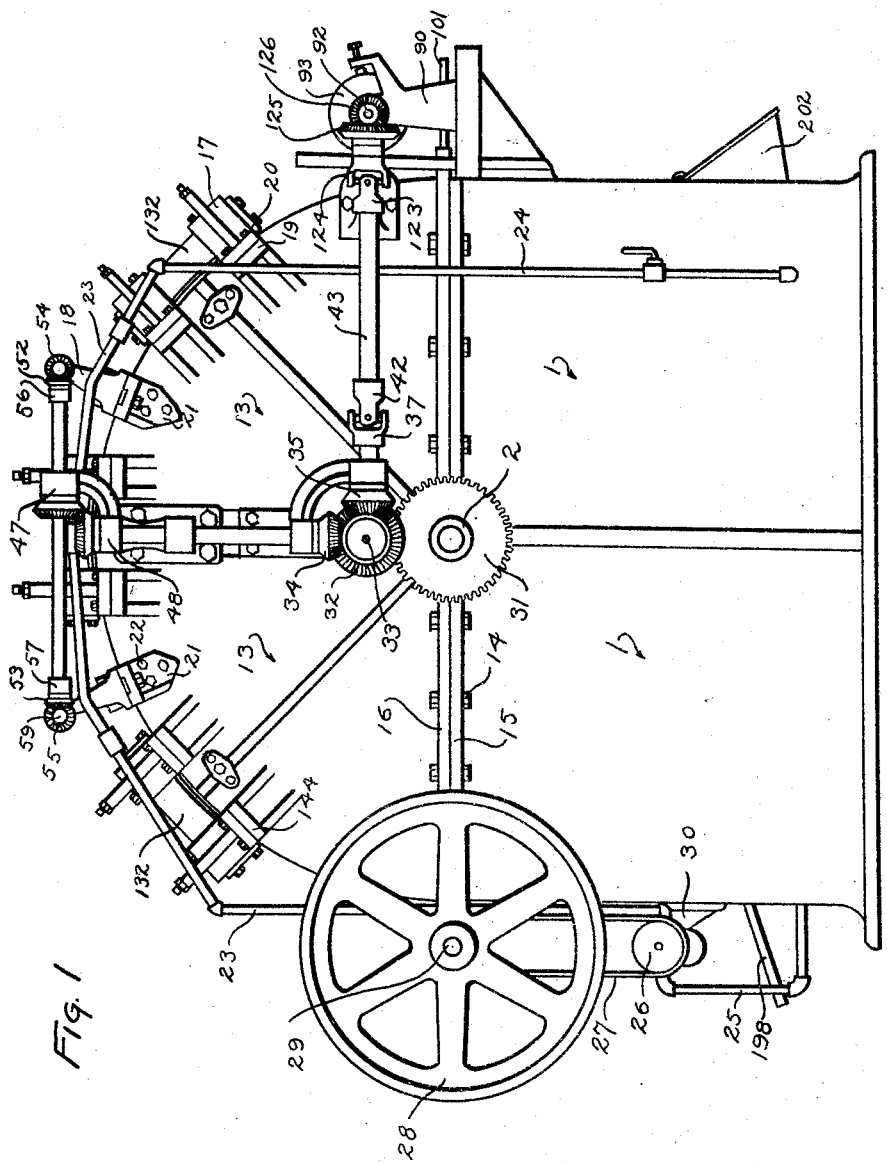
Inventor  
Frank Moeschl,  
George N. Stark,  
Arthur V. Regan.  
By Toulmin & Toulmin  
Attorney

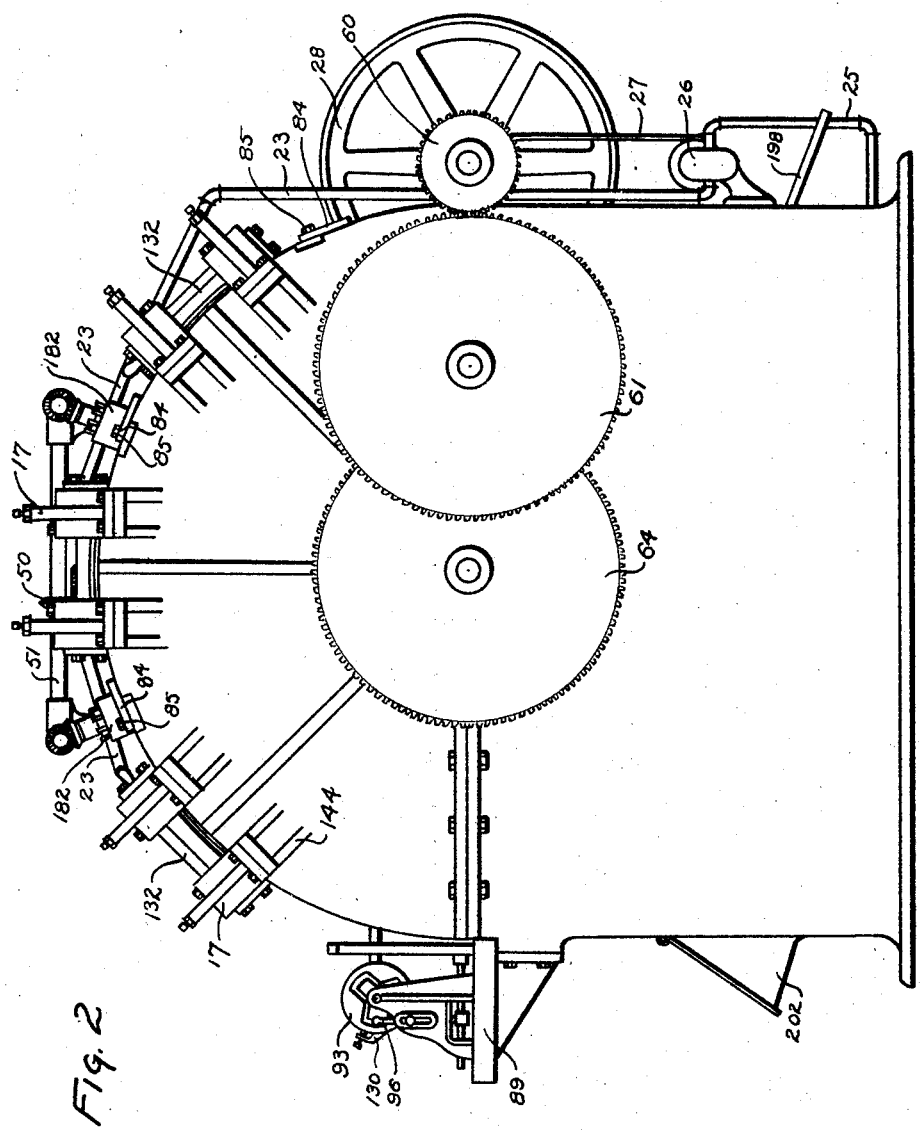

Feb. 24, 1925.
F. MOESCHL ET AL
1,527,693
MACHINE FOR CASTELLATING NUTS
Filed Dec. 8, 1921   15 Sheets-Sheet 3
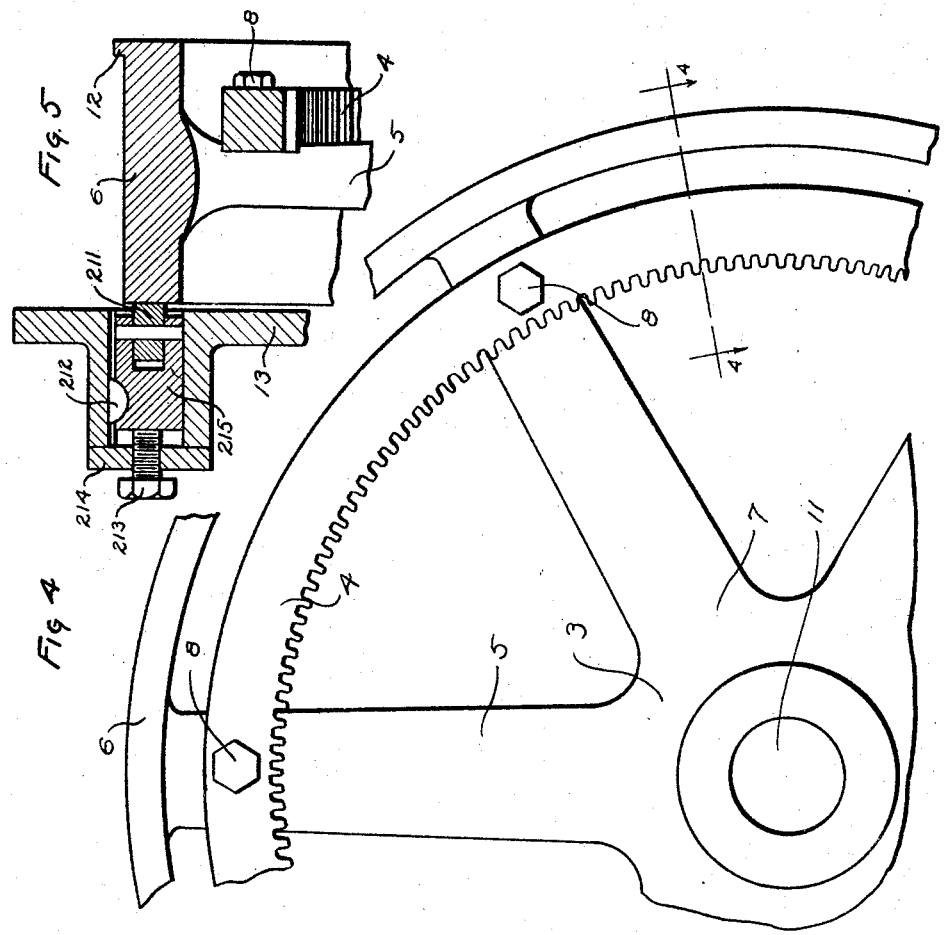
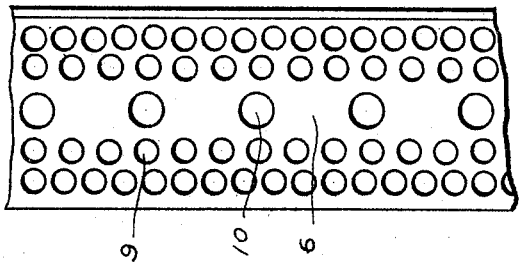

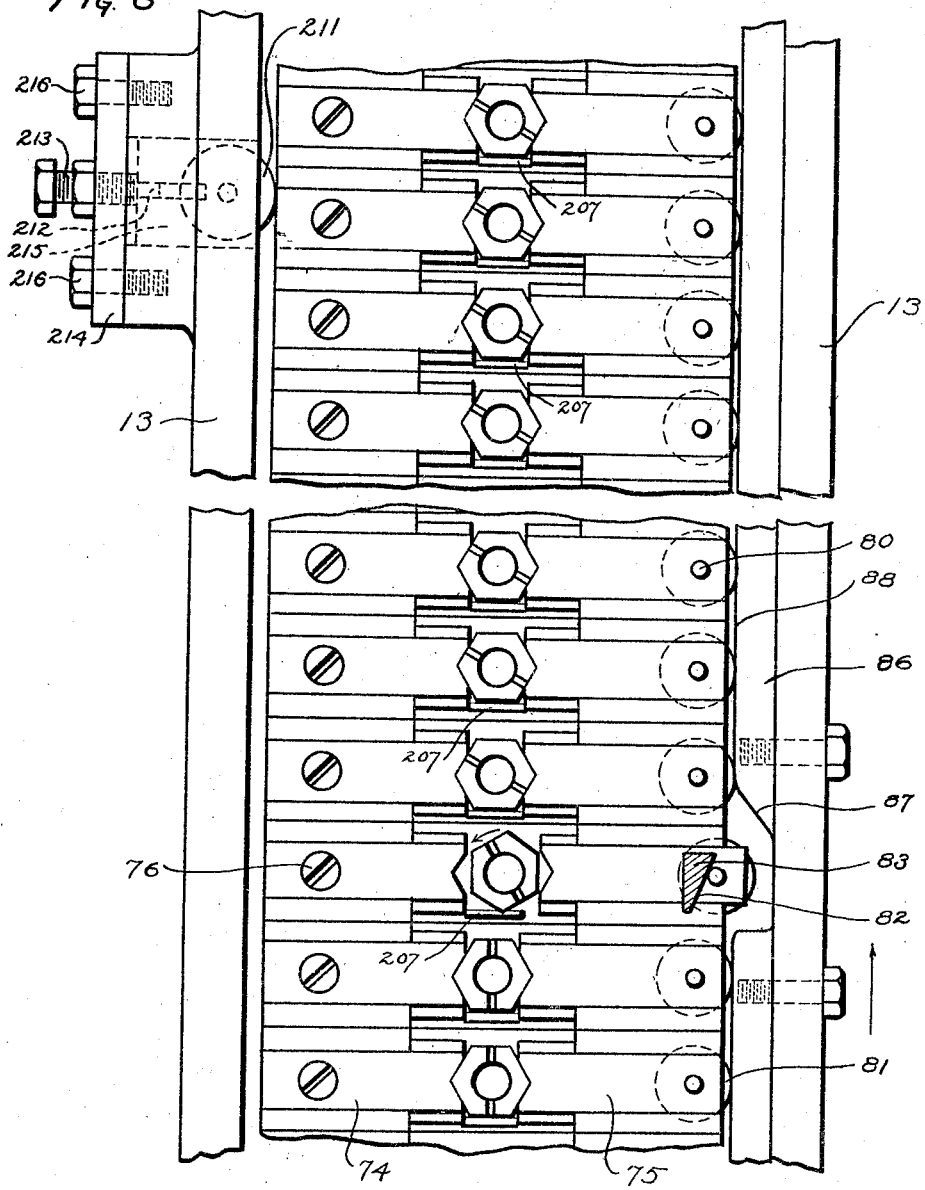

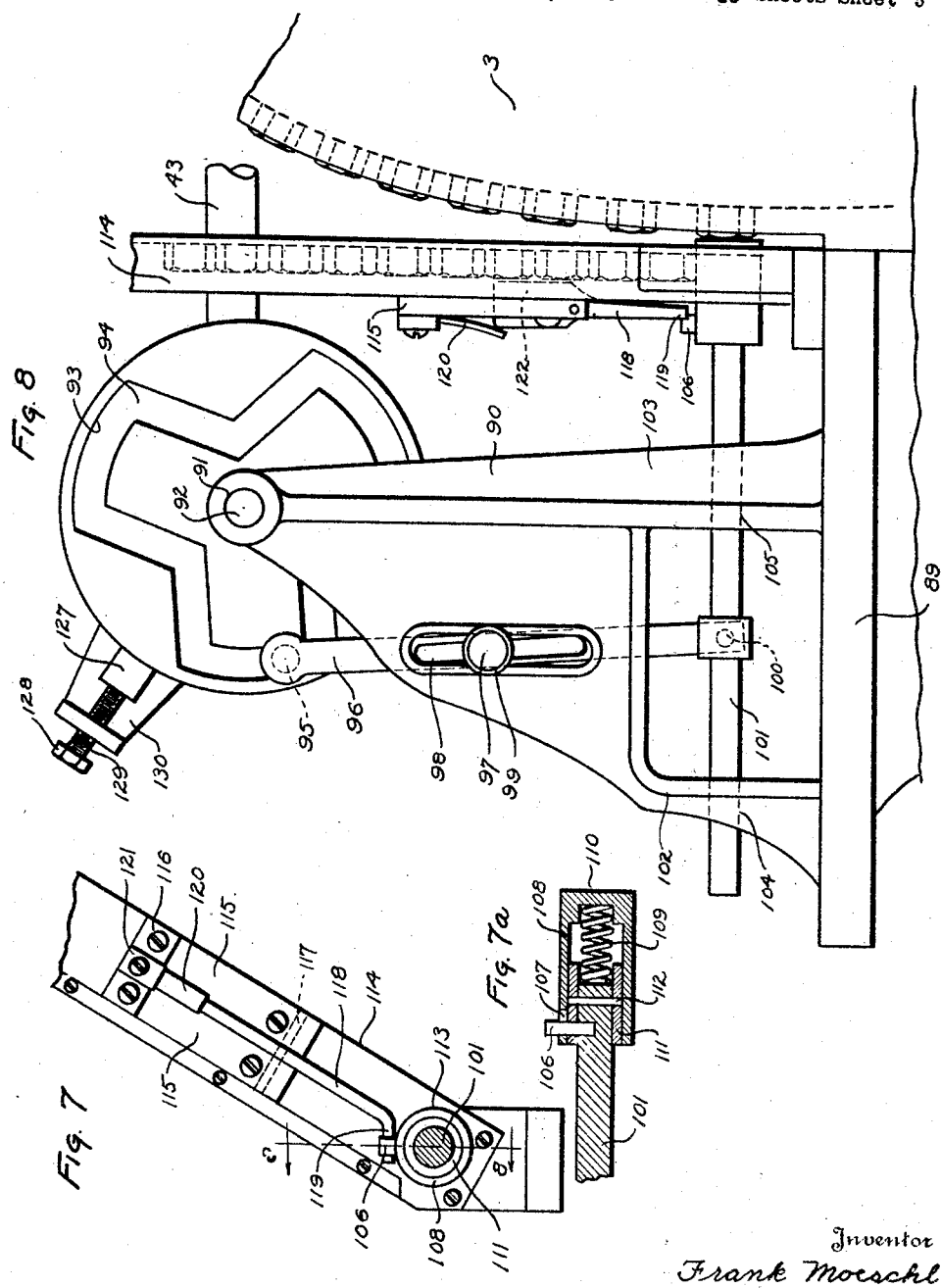

Feb. 24. 1925.
F. MOESCHL ET AL
1,527,693
MACHINE FOR CASTELLATING NUTS
Filed Dec. 8, 1921
15 Sheets-Sheet 6
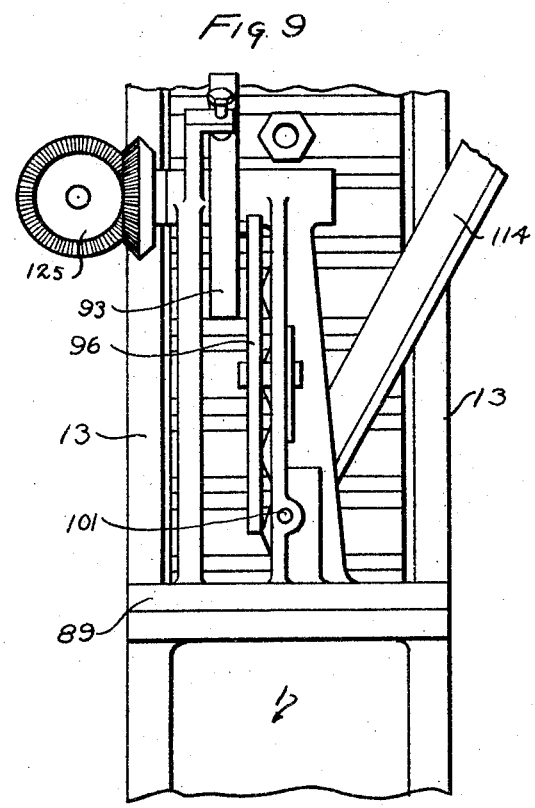
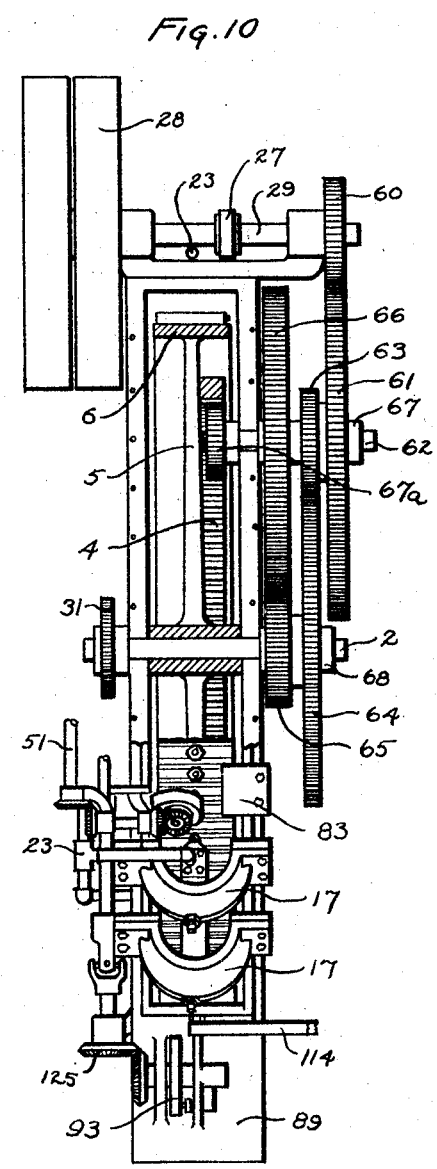
Inventor
Frank Moeschl
George N. Stark
Arthur V. Regan
By Toulmin & Toulmin
Attorney

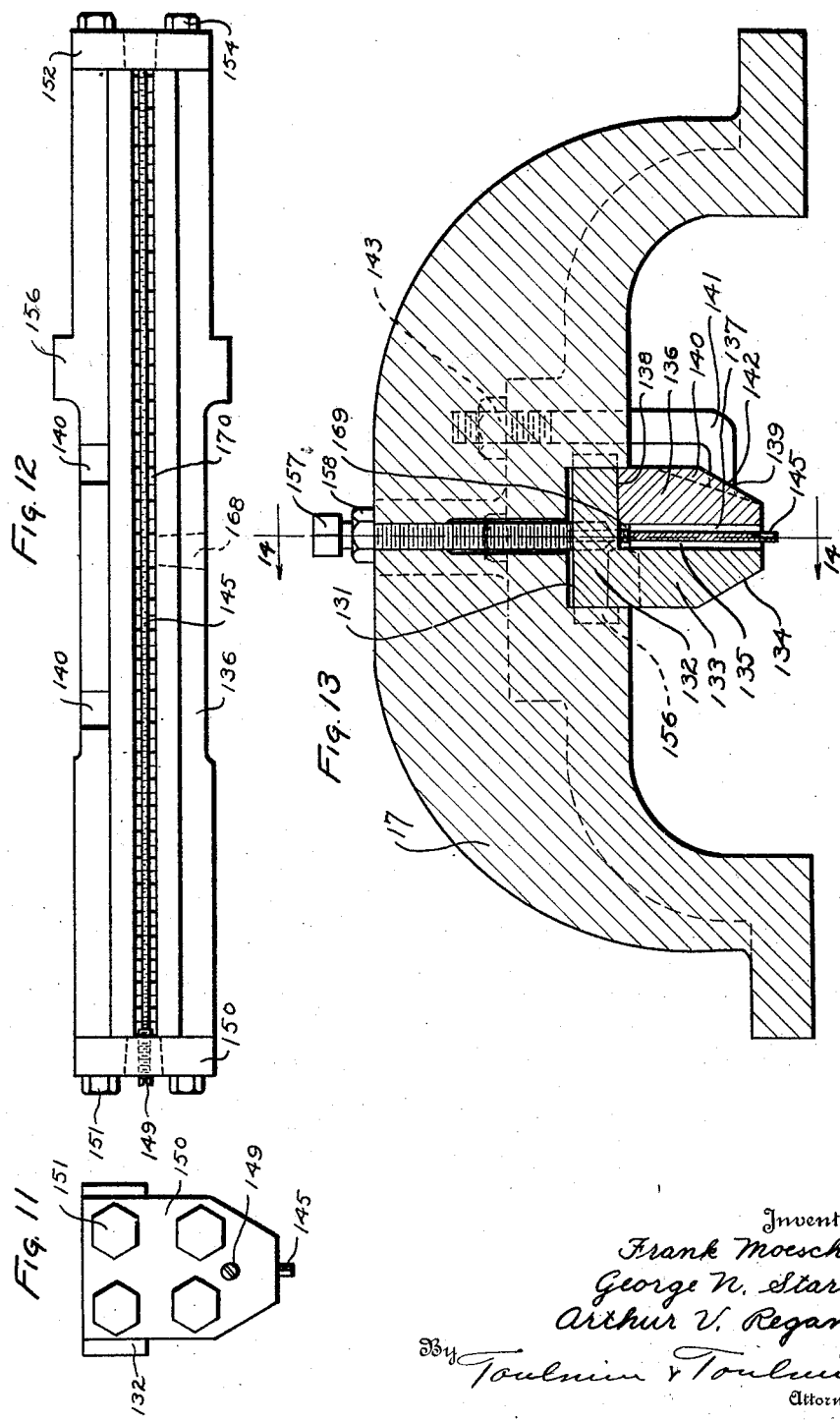

Feb. 24, 1925.
F. MOESCHL ET AL
1,527,693
MACHINE FOR CASTELLATING NUTS
Filed Dec. 8, 1921
15 Sheets-Sheet 8
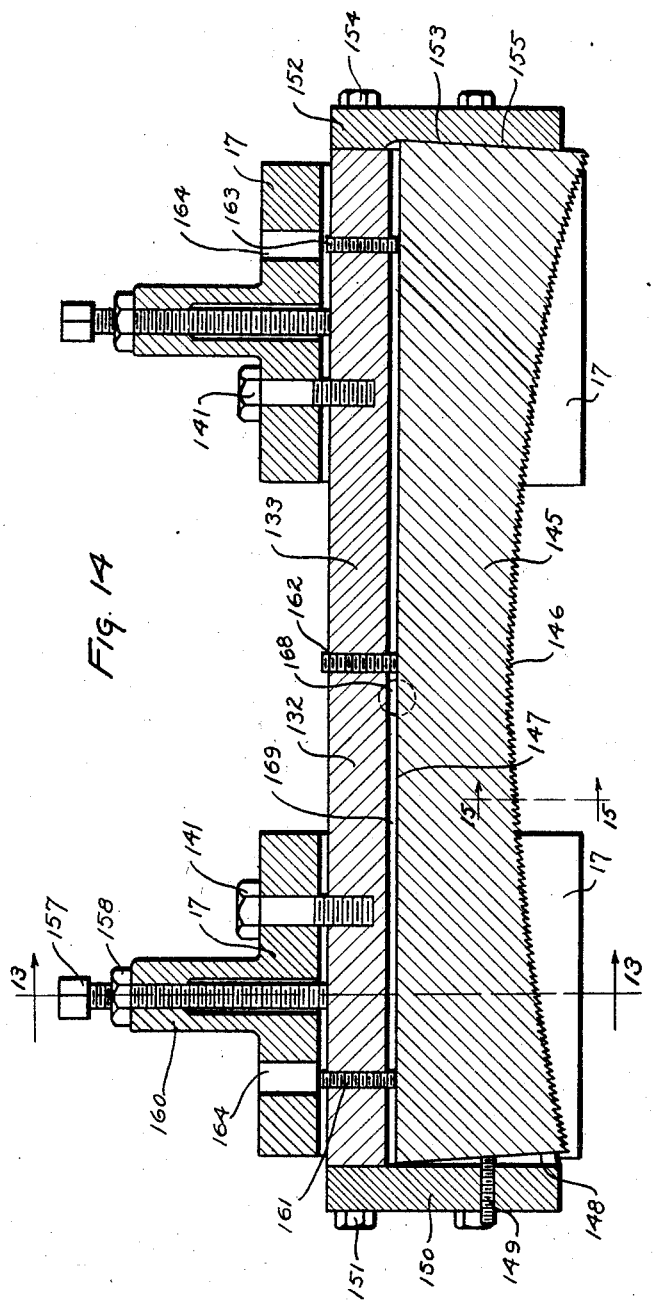

Feb. 24, 1925.
F. MOESCHL ET AL
1,527,693
MACHINE FOR CASTELLATING NUTS
Filed Dec. 8, 1921   15 Sheets-Sheet 9
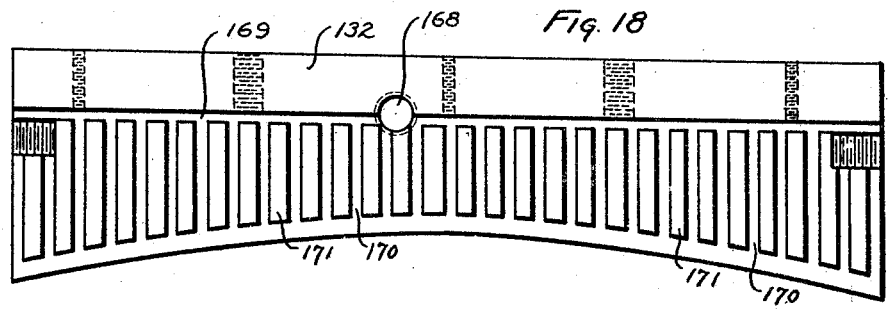
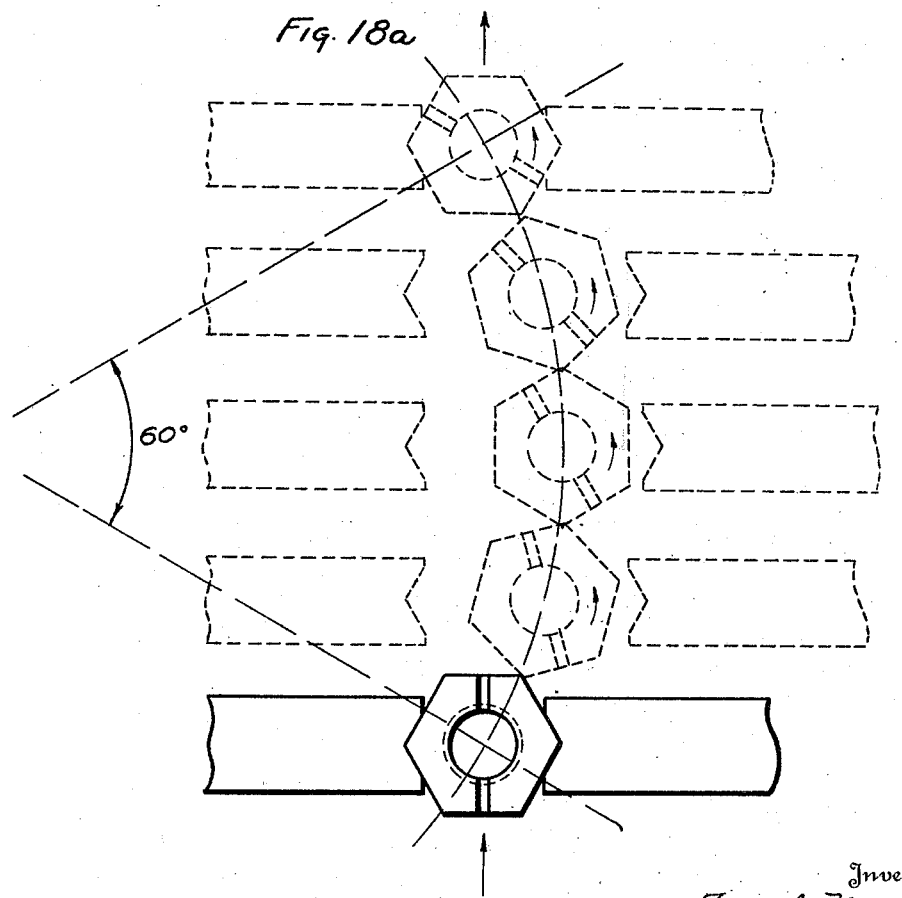

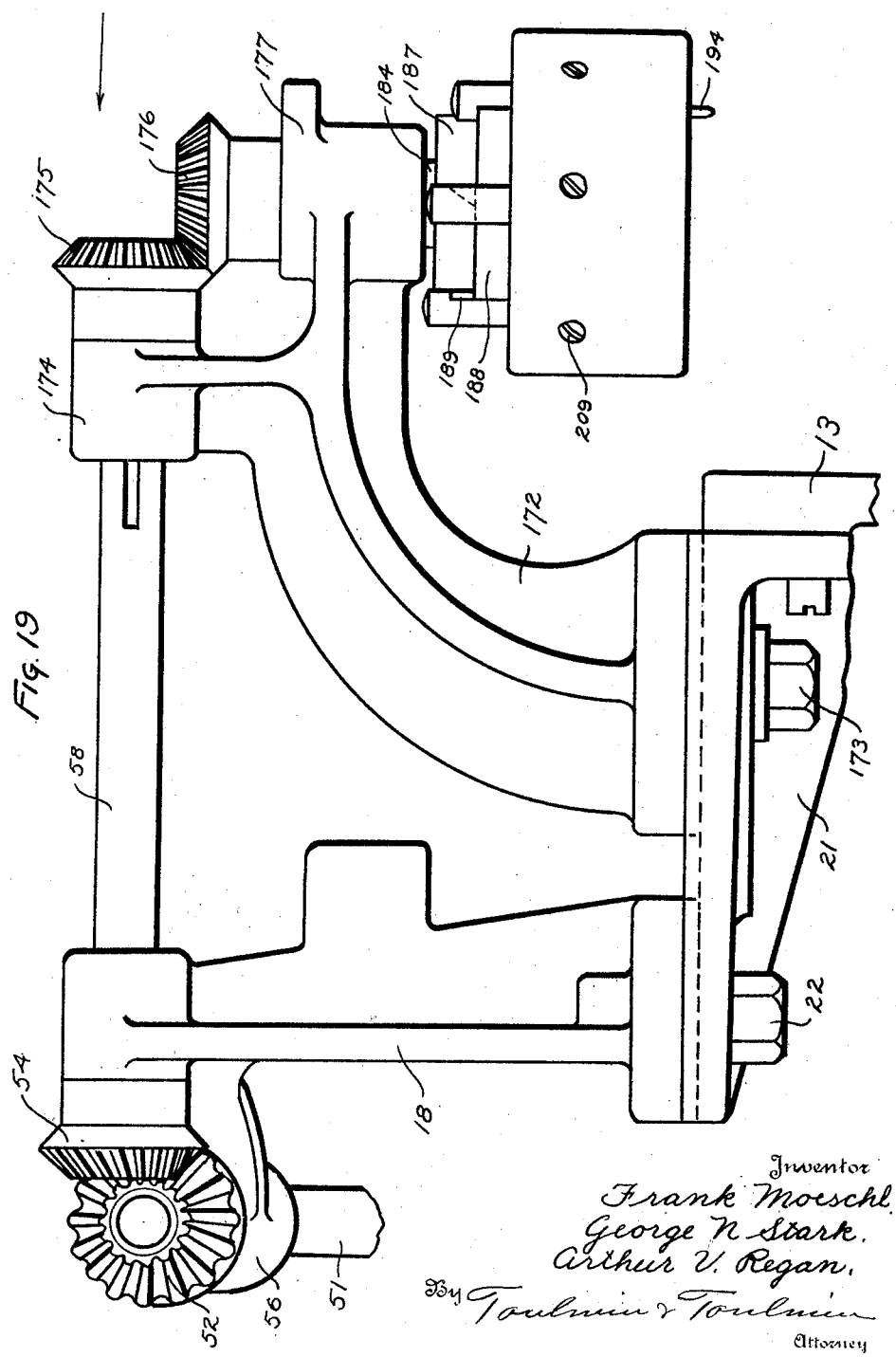

Feb. 24, 1925.
F. MOESCHL ET AL
1,527,693
MACHINE FOR CASTELLATING NUTS
Filed Dec. 8, 1921   15 Sheets-Sheet 11
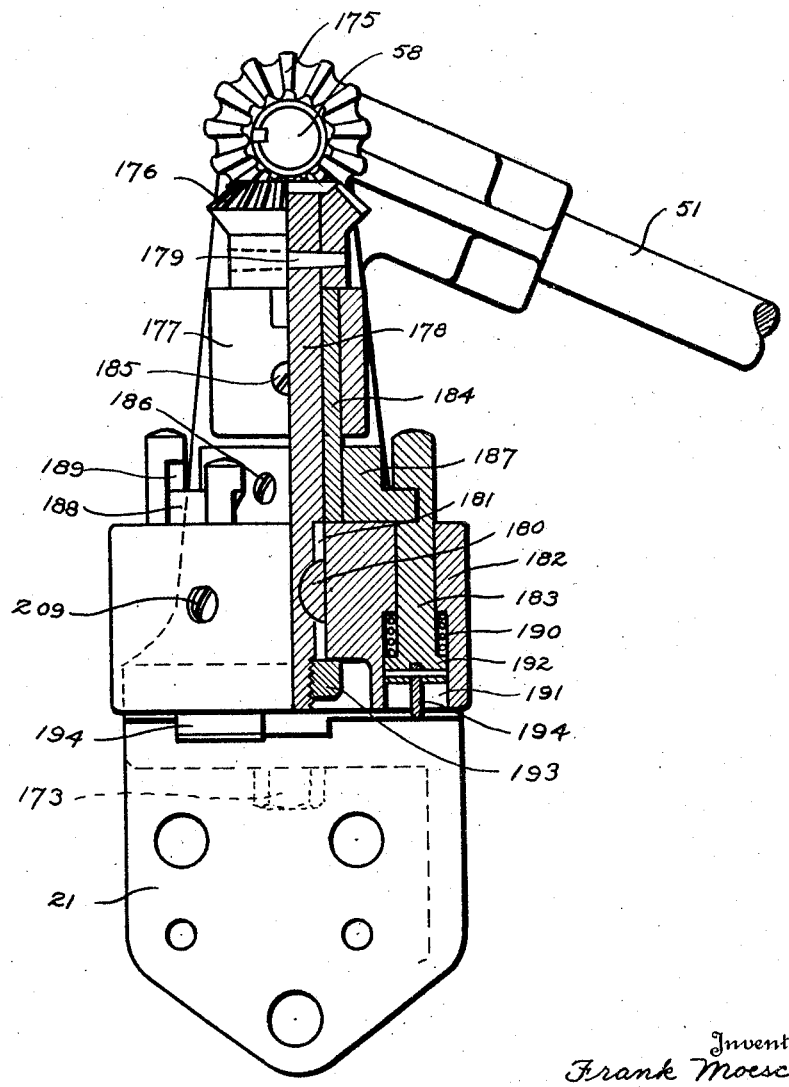

Feb. 24. 1925.　　　　　　　　　　　　　　　　　　　1,527,693
F. MOESCHL ET AL
MACHINE FOR CASTELLATING NUTS
Filed Dec. 8, 1921　　　　15 Sheets-Sheet 12
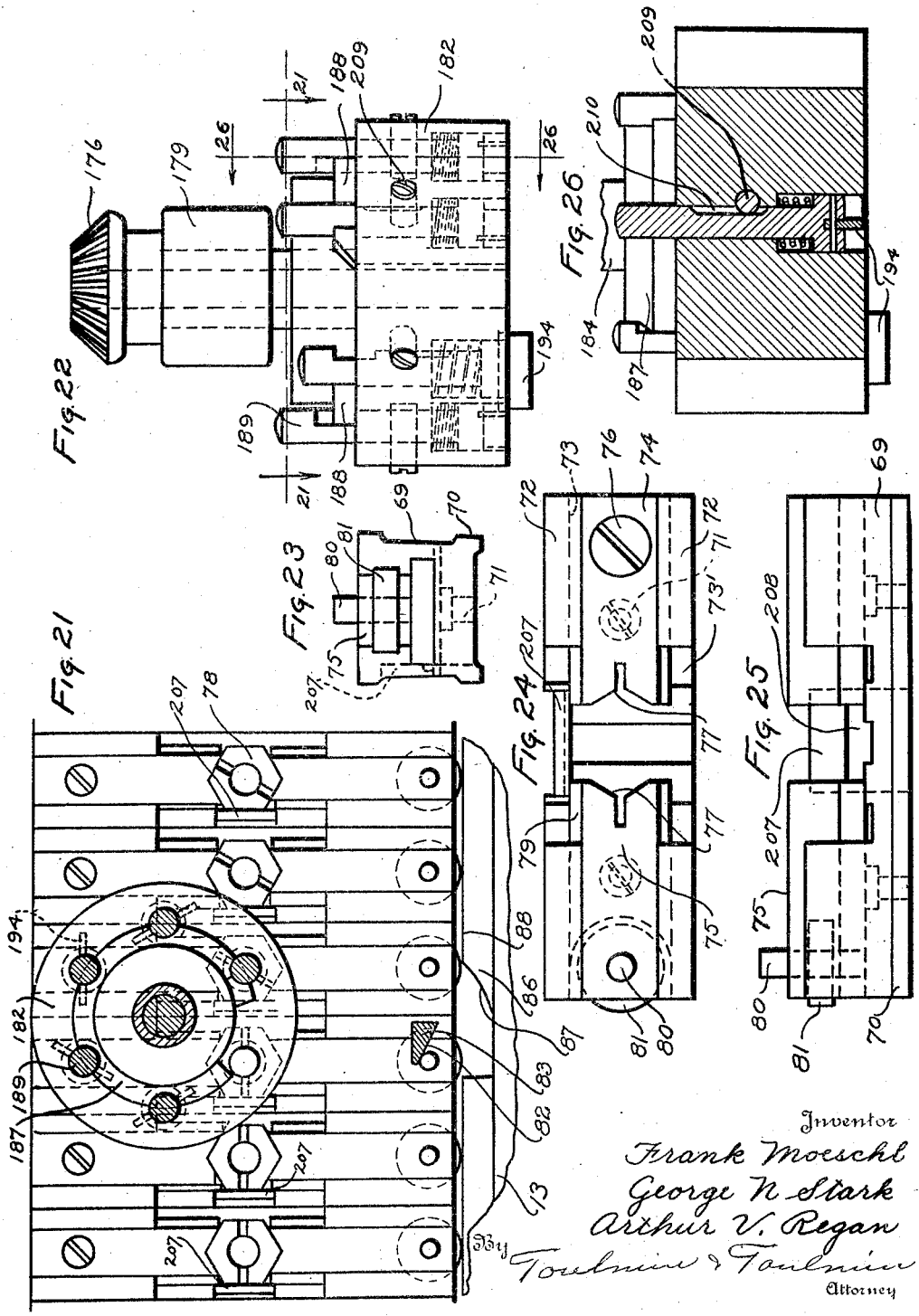

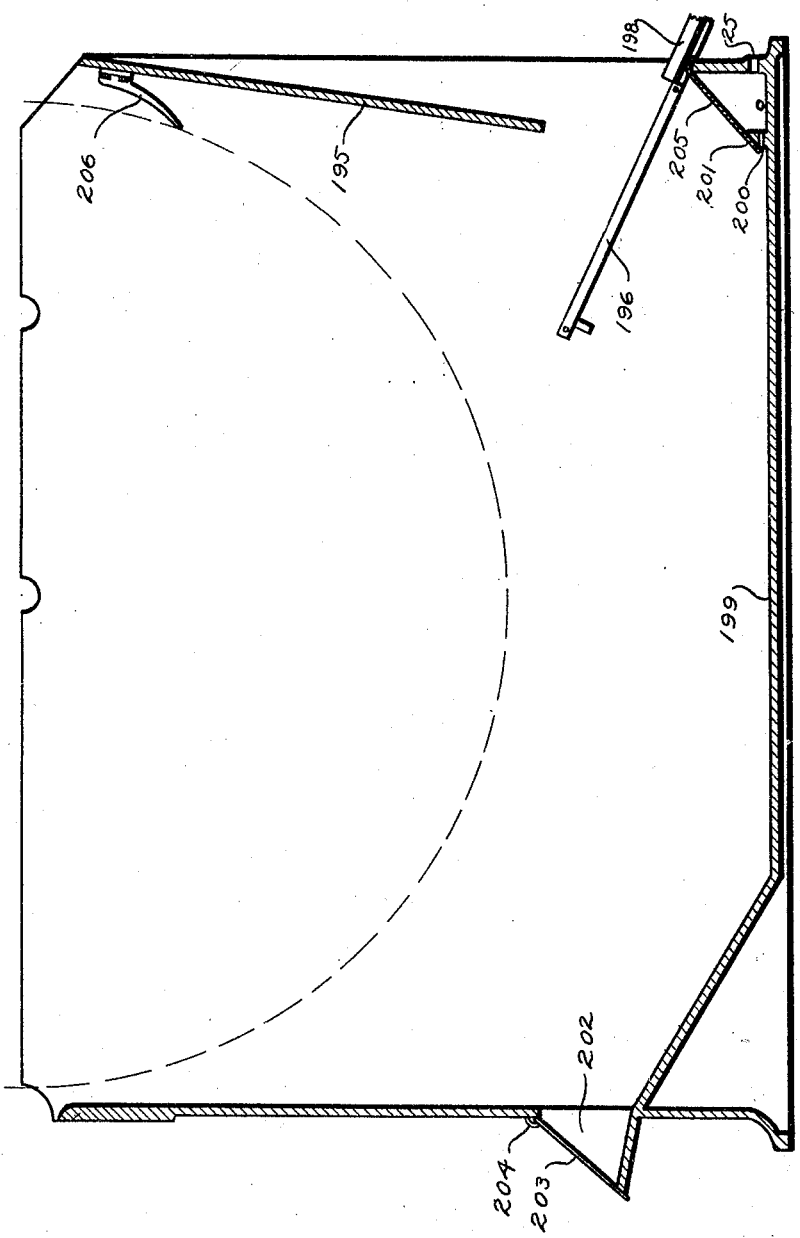

Feb. 24, 1925.                                                                              1,527,693
F. MOESCHL ET AL
MACHINE FOR CASTELLATING NUTS
Filed Dec. 8, 1921                   15 Sheets-Sheet 14
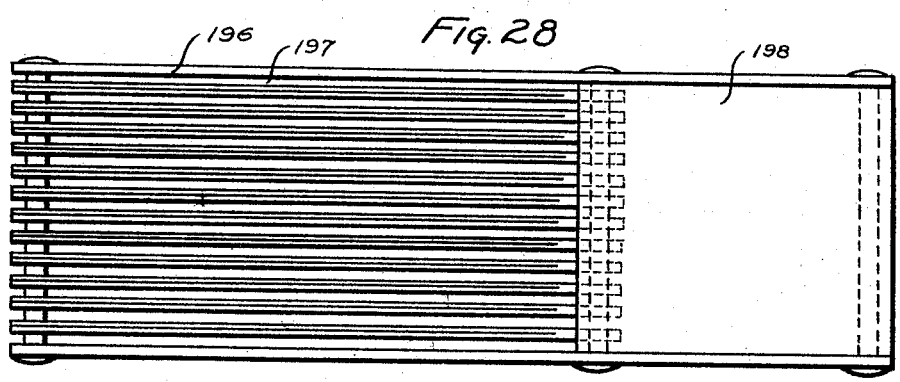
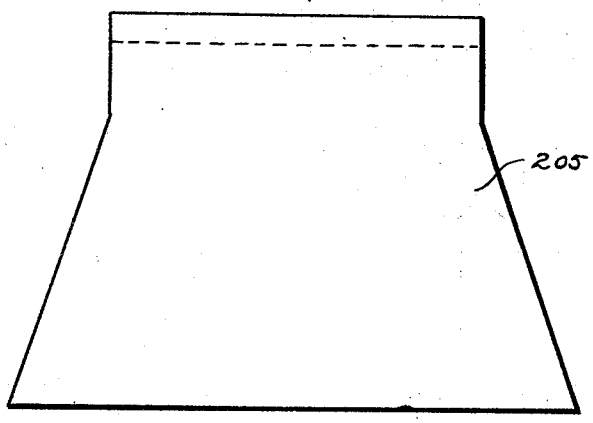
Inventor
Frank Moeschl
George N. Stark
Arthur V. Regan
By Toulmin & Toulmin
Attorney

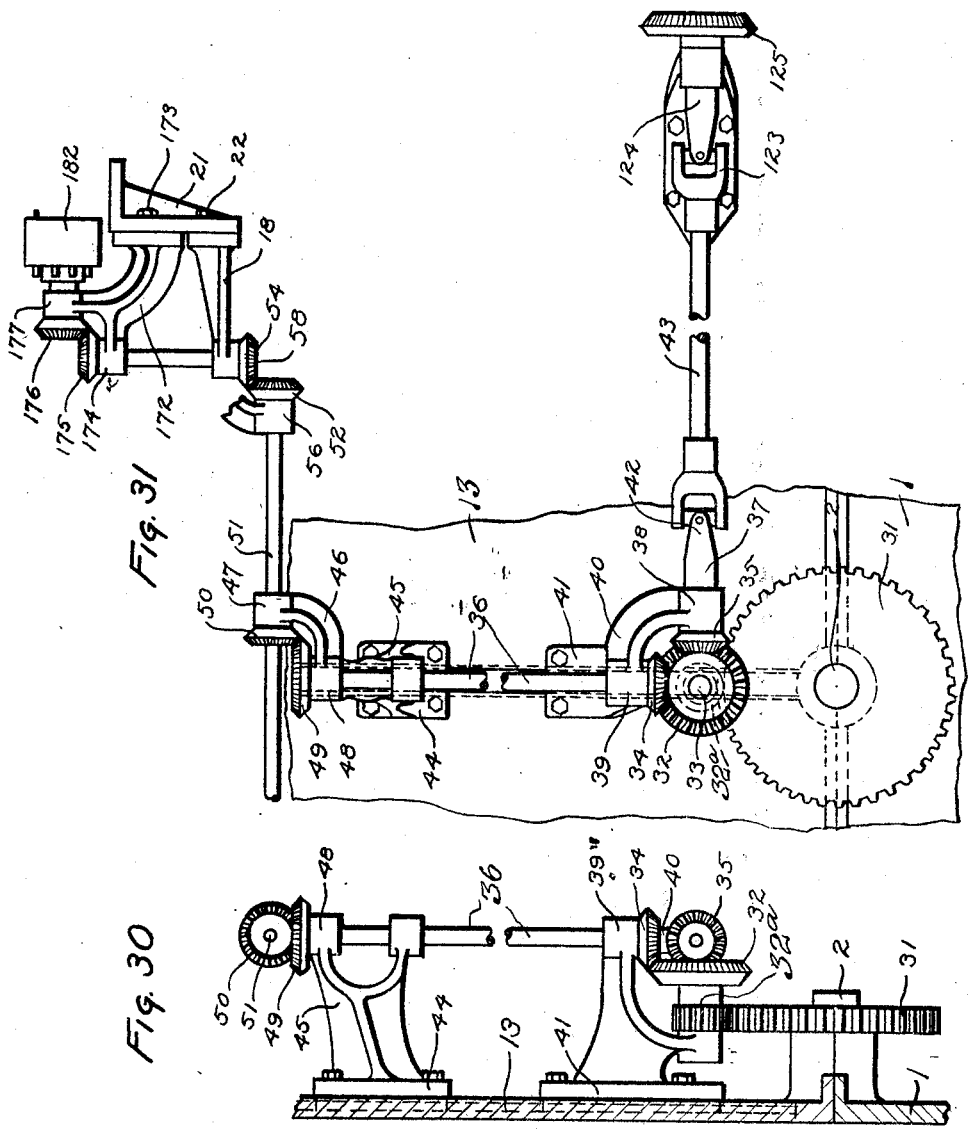

Patented Feb. 24, 1925.

1,527,693

UNITED STATES PATENT OFFICE.

FRANK MOESCHL, GEORGE N. STARK, AND ARTHUR V. REGAN, OF DAYTON, OHIO; SAID MOESCHL AND SAID REGAN ASSIGNORS, BY DIRECT AND MESNE ASSIGNMENTS, TO SAID STARK.

MACHINE FOR CASTELLATING NUTS.

Application filed December 8, 1921. Serial No. 521,000.

*To all whom it may concern:*

Be it known that we, FRANK MOESCHL, GEORGE N. STARK, and ARTHUR V. REGAN, citizens of the United States, residing at Dayton, in the county of Montgomery and State of Ohio, have invented certain new and useful Improvements in Machines for Castellating Nuts, of which the following is a specification, reference being had therein to the accompanying drawing.

Our invention relates to machine tools and in particular to a machine tool primarily for the purpose of castellating nuts.

It is obvious that while the machine is adapted for the castellating of nuts that it will be equally adapted for other metal working operations where the work is to be acted upon by metal working tools and is to be moved from position to position so that different parts of the work may be affected by metal removing elements.

The object of the invention is to provide a machine that will rapidly and accurately castellate nuts. It is also an object of the invention to provide a machine which will automatically feed the nuts to the castellating mechanism proper and will deliver the nuts free from oil and chips in condition for them to be used.

It is a further object of the invention to provide a lubricating system in order that the temper of the tools and of the nuts themselves may not be altered during the necessary operations incident to the operation of the machine.

It is a further object to provide a system of lubrication which will enable the machine to utilize the same lubricant over and over again free from any foreign material, such as chips or shavings from the cuttings.

It is an object of the invention to provide a machine that will move at a uniform rate, steadily and without vibration, insuring absolute accuracy of the cutting of the metal in the machine. It is a further object of the invention to provide a machine which will permit of the movement of the work being acted upon from position to position during successive stages of the operation.

It is an object of our invention to provide a machine which will positively feed each nut or each piece of work as a separate unit, suitably clamp it into the machine, permit of the metal removing tool to act upon it, positively unclamp the piece of work, positively reposition it, and positively fasten it in its new position simultaneously moving the work to a new position for a new metal removing operation and finally to unfasten the work on the machine and deliver it in its completed condition.

It will be obvious that we comprehend within our invention the utilization of multiple units of this machine, such as a plurality of moving members carrying a plurality of work pieces or a single moving member carrying adjacent work pieces to be acted upon by adjacent cutting members. The fundamental parts of our invention, which are disclosed here in their several combinations, may be multiplied and varied without departing from the spirit and scope of this invention.

We also desire to comprehend within our invention the method of castellating nuts, including the loading, clamping, moving, broaching or cutting, twisting, lubricating and unloading of the work relative to the machine and we do not desire to be confined to any special sequence of operations, save as may be necessary for the effective operation of the machine.

It is the object of our method and of our mechanism to very rapidly, and therefore economically produce castellated nuts in a simple machine of rigid and sturdy character. Heretofore, all attempts to perform this operation have necessitated complicated machines involving complicated gearings, springs and other mechanism which necessitated fine adjustments, frequent repairs and expert care to perform the operations at great expense.

Referring to the drawings:

Fig. 1 is a side elevation of the complete machine from the operating side for the lubricating system and work adjusting system of parts;

Fig. 2 is a side elevation of the complete machine from the driving side, illustrating the combination of gearing which may be varied to suit the speed desired;

Fig. 3 is a plan view of a portion of the master wheel showing the apertures to contain the various retaining parts for various types of lagging to accommodate different sizes of jaws;

Fig. 4, is a side elevation of a portion of this master operating wheel;

Fig. 5 is a section on the line 4—4 of Fig. 4;

Fig. 6 is an enlarged plan view of the master wheel with the jaws mounted thereon, nuts being held by the jaws and the cam operating mechanism illustrated with a portion of the cam operating mechanism in section. This view also illustrates the retaining means to retain the operating wheel in a true position as it rotates;

Fig. 7 is a detailed side elevation of the delivery tube and interlocking mechanism for delivering the nuts one by one to the machine;

Fig. 7ª is a section of the head of the delivery plunger of the delivery mechanism;

Fig. 8 is an enlarged side elevation of the delivery mechanism;

Fig. 9 is an end elevation of the machine from the delivery mechanism side;

Fig. 10 is a plan view of the machine showing in detail the driving mechanism;

Fig. 11 is an end view of the retaining plate for the forward end of one of the broaches;

Fig. 12 is a bottom plan view of the retaining mechanism, side clamps and a broach clamped therebetween;

Fig. 13 is a section through the bridge supporting the retaining mechanism for the broach illustrating partially the adjusting mechanism for the several parts;

Fig. 14 is a longitudinal section of a pair of supporting bridges, a broach and the cooperating mechanism for supporting the broach in position;

Fig. 15 is a transverse section of the broach;

Fig. 16 is a plan view of the broach;

Fig. 17 is a side elevation of a portion of the cutting members of the broach;

Fig. 18 is a side elevation of the inside of one of the side clamping members for the broach showing the passageways for the delivery of lubricant;

Fig. 18ª is an enlarged diagram illustrating the movement of a nut under the twisting head;

Fig. 19 is an enlarged view of the operating gearing and supporting frame work together with a twisting head for twisting each nut in succession to present its face for a different operation by a different broach;

Fig. 20 is an end elevation of Fig. 19 partially in section looking in the direction of the arrow in Fig. 19;

Fig. 21 is a plan view of the wheel with nuts in place with the twisting head operating in conjunction with the wheel to twist the nuts;

Fig. 22 is a detail elevation of the twisting head;

Fig. 23 is an end view of the lagging and one portion of the clamp for the nuts;

Fig. 24 is a plan view of the lagging and jaws for clamping on the nuts;

Fig. 25 is a side elevation of an individual lagging with its individual stationary and movable clamping members together with the pin for operating the movable member outwardly and the roller for operating the movable member inwardly;

Fig. 26 is a vertical section through the twisting head and one of the twisting pins;

Fig. 27 is a vertical section through the base of the supporting frame work and casting for supporting the machine showing the delivery mechanism and the mechanism for straining the oil and chips, as well as draining the oil and chips from the nuts;

Fig. 28 is a plan view of the delivery grating over which the nuts are delivered after having been finished and from which the oil and chips are drained;

Fig. 29 is an end elevation of a baffle plate used to divert the oil and chips to the proper compartment from which the oil is drained into the pumping mechanism for return into the system of lubrication;

Fig. 30 is an enlarged side elevation of the mechanism that drives the twisting heads and the delivery plunger; and, Fig. 31 is a plan view of Fig. 30.

Generally speaking, the method of operation of the machine is as follows: Nuts in succession individually are fed to the face of the master wheel. The jaws on the face of the master wheel are open when a nut is put in place and thereafter the jaws are immediately clamped upon the nut to hold it firmly in position. The master wheel moves upwardly with the nut in position bringing it beneath a broach which cuts the requisite slot across the face of the nut. Immediately thereafter the nut is unlocked in the jaws that hold it, twisted 60°, again locked in position in the jaws and another slot is cut in it by another broach. This performance is repeated again so that the finished nut as it passes downwardly to the discharge point has three slots cut in it at equal distances from one another. During the course of the cutting operation the nut is properly lubricated. It is unlocked on the other side of the wheel at approximately 180° from the point at which it started, and allowed to drop upon a combination drain and delivery chute which delivers it to any desired receptacle or endless belt for packing or for use, the drain chute allowing the oil and chips to drain off of the nut as it rolls down to the receptacle or endless belt.

In detail, the mechanism is as follows: A supporting base 1 is provided in the form of a rectangular casting, at the top of which and in the middle thereof is located a bearing 2 for supporting the main shaft of the master wheel 3. The master wheel 3 has on the inner surface thereof an internal gear 4. This wheel 3 is composed of spokes 5, a rim 6, and a hub 7. The internal gear 4 is bolted to the spokes 5 by the bolts 8.

The face of the rim 6 is perforated with the holes 9 and 10 at varying distances from one another and of varying sizes to accommodate the bolts which retain varying sizes of lagging which in turn accommodate varying sizes of jaws to embrace varying sizes of nuts or other pieces of work to be worked upon.

It will be readily understood that while we are referring to castellating nuts as the preferred work of this machine, yet it is susceptible of adaptation to other types of work and other configurations of pieces of work.

This master wheel 3 is carried in broad bearings in the casting 1 on the shaft 11 so that it turns steadily and firmly with no vibration. The rim 6 has a shoulder 12 (Fig. 5) which engages with the lagging hereinafter to be described which is mounted on the periphery of the rim 6 and forms a firm retainer for preventing the shifting of the lagging as some considerable strain transversely of the wheel is imparted to it and the members mounted upon it during the course of the operation of the machine.

Upon the casting 1 is mounted on either side top castings 13 bolted by bolts 14 through flanges 15 and 16 on 1 and 13 respectively. The top castings form the support for the arches 17 carrying the broaches for the brackets 18 carrying the twisting or turning heads and for the supporting mechanism for the driving shaft to actuate the twisting heads. Upon 13 are cast shoulders 19 upon which are mounted the arches 17. These arches are retained on 19 by the bolts 20. Brackets 21 support the brackets 18. These two brackets are bolted together by the bolts 22.

A system of lubrication is provided through the use of the feed pipe 23 which feeds respectively the several broaches with proper lubricating liquid and a return pipe 24 to a reservoir or catch-all for waste lubricant which is strained in a manner to be hereinafter described and elevated again through the pipe 25 by the pump 26 which is driven by the belt 27 from the master driving pulley 28 mounted on the shaft 29. The master driving pulley may be mounted upon the machine itself or it may be located at a distance driving the gearing of the machine through a shaft and worm in any other preferred manner depending upon the location of the machine and the particular machine shop equipment in which it is located. The pump 26 is mounted on the casting 1 by means of the bracket 30.

Referring to Figures 1 and 31, there will be seen a gear 31 mounted on the shaft 2 and driven by it which in turn drives the gear 32. This gear 32 is journaled on a stub shaft 33 and the casting 13. Meshing with 32 is the bevel gear 34 and a bevel gear 35 driving respectively the shafts 36 and 37. These shafts are carried in collars 38 and 39 joined by the semi-circular member 40. 39, 40 and 38 are adapted to move as a unit on the bracket 41 which slides adjustably on the casting 13. This adjustable movement is compensated for by the universal joint 42 which links 37 and the shaft 43, 43 being used to drive the loading mechanism of the machine. The purpose of this adjustment is to permit of different sizes of gearing to be used to vary the speed at which the delivery mechanism and the twisting or turning mechanism is run.

It will be understood that the shaft 36 is the driving shaft for the twisting or turning mechanism, while 43 is the driving shaft for the loading or delivery mechanism. The casting 44 supports the bracket 45 in which the upper end of the shaft 36 turns. 44 is likewise bolted to 13. The semicircular member 46 connects the collars 47 and 48 that support respectively the bevel gears 49 and 50. In 47 there also turns the horizontal cross shaft 51 upon which the gear 50 is mounted. On either end of 51 is a bevel gear 52 and 53 meshing with corresponding bevel gears 54 and 55.

The shaft 51 is supported in brackets 56 and 57 at either end thereof. Gears 54 and 55 are supported in brackets 18 and turn on shafts 58 and 59.

Referring to Figs. 2 and 10, 29 is the main driving shaft on which is mounted a gear 60 that meshes with another gear 61 on a shaft 62. Shaft 62 has mounted on it a gear 63 connected to gear 61, which drives a gear 64 on the shaft 2. On this same shaft 2 is mounted a gear 65 which in turn drives a gear 66 that is mounted upon and affixed to shaft 62. It will be understood that gears 61 and 63 are loosely mounted on shaft 62 and are retained thereon by a collar 67 or any other suitable means. On shaft 62 is permanently mounted a small pinion 67ª that meshes with the internal gear 4 thus driving the master wheel 3.

68 is a collar retaining gears 64 and 65 on shaft 2. These gears turn together and are loosely mounted upon shaft 2. Various combinations of gears may be mounted in these locations in order to vary the speed of driving the mechanism.

Clamping mechanism.

Referring to Figs. 23, 24, 25 and 21, there will be seen the construction of the rim of the master wheel, the lagging mounted thereon, and the movable and stationary jaws mounted on the lagging.

69 is a piece of lagging that is mounted transversely upon the periphery or rim of the wheel 3. 69 is composed of a main body member 70 which is retained by one or more bolts 71 on the rim of the wheel. These bolts pass through the apertures 9 or 10 depending upon the number and size of the bolts as shown in Fig. 3.

The lagging is provided at either end on either side thereof with vertical walls 72—72 that have cut in their interior adjoining faces the slots 73. Operating in these slots are the jaws 74 and 75. The jaw 74 is a stationary jaw and is retained in a fixed position by the screw 76 or other retaining means.

It will be understood that the side-walls 72 are cut away at the center of the lagging as at 73'. Each jaw has a pair of sloping faces 77 for engaging the sides of the nut or other pieces of work being acted upon. Such a piece of work is designated, as in Figure 21, 78. At the outer end of the movable jaw 75 which has the shoulders 79 or keys traveling in the slots 73 or keyways is a vertical pin 80 and rotating on this pin a roller 81. The pin 80 projects above the general surface of the lagging and movable jaw so that it will come in contact with the sloping surface 82 of the cam member 83 carried by the cam plate 84 which is supported by the bolts 85 on the casing or casting 13.

In Fig. 21 it will be seen that the interior of the casting 13 is provided with a cam plate 86 with a sloping surface 87. The purpose of this sloping surface is to have a shoulder against which the roller 81 will come in contact when the roller, together with the sliding jaw, has been moved outwardly by reason of the pin 80 coming in contact with 83. This engagement of the roller 81 with the surface 87 returns the sliding jaw to its permanent position. The flat surface 88 retains the roller in its fixed position and retains the sliding jaw in its innermost position in firm engagement with the work held between it and the stationary jaw.

In Fig. 6 there will be seen another view illustrating these stationary and sliding jaws together with the supporting lagging.

Loading mechanism.

After acquiring this understanding of the method by which the work such as a nut to be castellated is retained on the face of the master wheel, the next step is the loading of the machine, as shown in Figs. 7 and 8.

This is accomplished as follows: On the supporting bracket 89, fastened to the main casting or housing, is mounted a bracket 90 that has journaled at 91 a shaft 92 on which is mounted a cam wheel 93 with a slot 94 cut in the face thereof. In this slot travels a pin 95 on the end of an operating arm 96 that is guided vertically at one point by reason of the fact of having a transverse pin 97 mounted midway thereof and traveling in a vertical slot 98 in the casting 90. This pin is retained in engagement with the slot by the washer 99 on the end of the pin so that the casting 90 is embraced between the washer and the arm 96. The lower end of this arm 96 is pivoted at 100 to the plunger 101. The plunger 101 reciprocates in and is guided by the supporting legs 102 and 103. The plunger 101 passes through the apertures 104 and 105. The operating end of the plunger is shown in section in Fig. 7ª, the section taken on the line 8—8 of Fig. 7. This head consists of the plunger proper, designated 101 with a pin inserted therein at right angles, designated 106. This pin travels in a slot 107 in the tubular head 108. This tubular head has interposed between its inner end and the end of 101, a helical spring 109 to maintain it in extended position. The end 110 of 108, comes in contact with the surface of the work as it is thrust into the jaws on the periphery of the master wheel. The purpose of the helical spring is to form a shock absorbing cushion member and to also insure that the work will be thrust home to its final position, the spring accommodating any irregularities in movement of the plunger and work and taking up any shock incident to the plunger coming to rest. 111 is a collar retained by a pin 112. This collar provides a bearing surface for the movement of 108.

The end of the plunger 101 is shown in Fig. 7 and travels through an aperture 113 in a delivery tube 114 down through which the nuts pass on their way to being placed one by one on the periphery of the wheel and clamped thereon by the stationary and sliding jaws. This tube 114 is just wide enough for the nuts to pass in single file down through it. The nuts are fed to it by hand at the top of the tube.

On one face of the tube, towards the operator, are mounted a pair of parallel plates spaced apart from one another, designated 115, 115 and retained thereon by screws 116. Pivoted between these two plates at 117 is a depending latch or finger 118 that has a laterally projecting foot 119 which comes in contact with the pin 106 as will be hereinafter described. This finger 118 has its upper end beyond the pivotal point placed beneath a spring member 120 that is retained in position by the retaining plate 121.

The inner face within the tube 14 of 113 is designated 122 and is long enough and broad enough to come in contact with the surface of the nuts to retain them positively in engagement with the tube to prevent them sliding down except when this finger 118 is moved and they are released.

The operation of this mechanism is as follows: The nuts are placed in the tube until this tubular hopper is full and the plunger is in its outermost position. In such position 118 has a surface 122 in engagement with the lowermost nut or nuts holding them from sliding down in front of the plunger 101. As the plunger head moves forward toward the rim of the master wheel 3, the lowermost nut is allowed to drop, together with the remaining nuts on top of the plunger due to the fact that the pin 106 comes in contact with 119, the lower end of 118. Consequently, the pressure is released on the nuts and the whole weight of the column of nuts rests upon 101 and the head 108. As the plunger is withdrawn the nut immediately resting upon 108 is allowed to drop in position in front of it between it and the periphery of the wheel in line for ejection into the space of the open clamping jaws on the periphery of the master wheel. The remaining nuts are held in position due to the fact that 122 has clamped them in the proper position due to the fact that the spring 120 is operating on the upper end of 118. When the plunger 101 again moves inwardly to thrust the nut in line with it into the position to be clamped by the jaws on the master wheel, the pin 106 releases the pressure of 122 on the nuts and allows another nut to drop down on top of 108 ready for its descent into its position for its ejection in turn.

In another portion of this specification it will be explained how the jaws are opened and how they are closed for the reception and clamping of each one of these nuts in succession on the periphery of this master wheel. It will be understood that the cam mechanism on the wheel 93 which causes the reciprocation at stated intervals of the plunger 101 is synchronized with the movement of the master wheel 3 through the agency of the gearing shown for instance in Fig. 1. It will be observed that the gear 31 is driven from the shaft 2 and in turn drives the gear 32, 35, the shaft 37, the joint 42 and the shaft 43, which, through the universal joint 123, drives the stub shaft 124, the bevel gear 125, the bevel gear 126 which is mounted on the shaft 92.

It will also be noted that adjacent the periphery of the wheel 93 is a brake shoe 127 actuated by a knurled head 128 on a connecting screw 129 turning in the support 130. The purpose of this brake shoe is to take up any lost motion in the several parts to maintain exact synchronism of the whole.

*Broaching or cutting mechanism.*

After the nut has been firmly clamped between the jaws carried on the periphery of the master wheel, it is elevated due to the turning of the wheel until it comes beneath the broach or cutting mechanism which scores a slot in the surface. The broach is so arranged that it is higher at the beginning of the cut than at the end of the cut so that it cuts away the bottom of the slot progressively.

The details of this construction of the broach, its supporting mechanism and the possible adjustments of it, will be found in Figures 11, 12, 13, 14, 15, 16, 17 and 18. The arches 17 of which there are a pair support a longitudinal member in a cutaway portion 131 cut in the under surface midway their length. This transverse member is designated 132 and has a depending downwardly projecting flange or retaining shoulder 133 that has a tapered outer face 134 and an inner corrugated face 135 which will be hereinafter described, but is more particularly seen in Fig. 18. This member is therefore L-shaped in section. Co-operating with this L-shaped section member is another plate 136 having a similar inner corrugated face 137. The upper end 138 of 136 abuts on the inner lower surface of 132. 136 likewise has a tapering outer surface 139 and cutaway portions 140 into which are projected the tapering fingers 141 having the sloping inner ends 142. These depending fingers 141 which support 136 by the engagement of the tapered surface 142 and 140 are passed through the supporting arch 17 and retained in position by the nut 143 threaded on each one of the members 141.

The outer ends of the arches rest upon the supporting ledges 144 on the margin of the castings 13.

Between the members 133 and 136 is clamped the broach 145. This broach is of the outside configuration shown in Fig. 14 where it is illustrated in section. The broach has a plurality of teeth 146 on the lower edge thereof. These teeth are located along an arc. The depth between the horizontal edge 147 and the forward teeth is less than the depth between that horizontal edge and the rear teeth, so that a progressively deeper cut will be taken out of the face of the nut when the slot is being broached as the nut passes in the direction of the arrow from the front to the rear of the broach.

The forward end of the broach slopes downwardly and to the right hand as at

148. This sloping end is engaged by a set screw 149 in the end plate 150 which is retained on the member 133 and 136 by the bolts 151.

At the rear of the broach there is an end retaining plate 152 that has a sloping inner surface 153. This end retaining plate is likewise retained by bolts 154 attached to the members 133 and 136. A similar sloping surface 155 abuts against 153 which prevents the rear end of the broach dropping downwardly. The set screw 149 forces these two faces together. The position of 136 and 133 is determined by the setting bolts 141 located in each of the cross arches 17. These bolts 141 serve to support 136 and 133 in abutment with the depending portions 156 of 17.

133 and 136 are positioned by the set screws 157 and the lock nuts 158. The screws 157 travel in the projections 160 on the surface of the bridges 17.

Individual adjustments of the position of the broach 145 are accomplished through the set screws 161, 162 and 163 that travel in 132 and abut on the top 147 of 145. Access is had to screw 161 and 163 through the apertures 164 in the arches or bridges 17.

The broach 145 has the teeth 146 (see Fig. 17) placed in succession to one another having a plurality of points 165. The arrangement of these points is as shown in Fig. 16 where there is an enlarged plan view of the broach teeth showing a main rib 166, teeth 146 joined thereto, with spaces 167 therebetween, having points 165.

The view in Fig. 15 is taken in the direction of the arrow and on the line 15—15 of Fig. 14.

Referring to Fig. 18 there will be seen an aperture 168 which is the opening of the pipe line through 132 communicating with the space 169 in 132 to permit of the passage of lubricating fluid from 168 fore and aft thereof so that the lubricating fluid may pass down through the passageways 170 communicating with the horizontal passageway 169 and thus lubricate the cutting teeth of the broach and to pass between those teeth on to the work such as a nut being castellated to properly lubricate it during the cutting operation. It will be observed that there is a similar space 169 (Figure 14) where the main oil supply tube is shown at 168. This permits the lubricant to flow in through 168 through the passageways 169 occurring on the top of 132 so that the oil can pass downwardly through the passageways 170 and between the teeth 146 of the broach. It will be understood that the ribs 171 come in contact with the sides of the broach so that the channels 170 are entirely free and separated from the sides of the broaches, thus permitting the free passage of fluid therethrough.

This lubricating fluid to be delivered through 168 is delivered thereto through the piping 23.

*Twisting or turning mechanism.*

The next step after a slot has been cut in the surface of the nut is to revolve it 60° in the direction of the arrow in Fig. 6.

This is accomplished as has been heretofore described by the outward movement of the movable jaw due to the contact of the pin with a depending cam surface and the consequent release of the nut which, resting upon the upper surface of the master wheel, cannot get away but is sufficiently loosened to permit of its proper revolution by the following described agency.

It will be understood that after this revolution the contact of the cam surface of the housing with the roller on the movable jaw will return the jaw to re-engage the nut in its new position, after the nut has moved 60° in the direction of the arrow shown in Fig. 6.

It is also to be understood that the master wheel is moving in the direction of the arrow in Fig. 6 shown along the edge of the wheel so that the nut will have a triple movement. It will have the general movement bodily with the wheel upon which it is resting, it will describe the arc shown in Fig. 18ª as it moves with the twisting head which revolves. It will move upon its center as an axis 60° and this center will follow the arc just mentioned. This compound movement results in the nut keeping pace with the moving master wheel and thereby maintaining its relative position with respect to the stationary and movable jaws so that when its 60° has been accomplished, it will be in position to be re-engaged by these jaws.

As has been already described, the twisting mechanism is driven through 51, the spur gears 52 and 54, and the overhead shaft 58.

The bracket 172 mounted on the bracket 21 and fastened thereto by the bolt 173 supports the inner end of the shaft 58 in the collar 174. On the end of 58 is a bevel gear 175 meshing with another bevel gear 176 that is supported in another collar 177 in which its shaft 178 turns. 176 is pinned to 178 by the pin 179 and turns with it. 178 is keyed by the key 180 in the slot 181 to the revolving head 182 that carries the plurality of twisting pins 183.

The sleeve 184 in which 178 turns loosely is fastened by the set screw 185 to 177 and will remain stationary. To this sleeve is fastened by the screw 186 the cam ring 187. This cam ring has a cam surface 188 where it is cut away. This cam surface comes in engagement with the cutaway portions 189 of the twisting pins 183 elevating them in succession as the pins are rotated around this cam ring by the head 182. These pins are normally drawn downwardly due to the action of the helical spring 190 within the tubular cutaway portion 191 in the head 183. These helical springs are contained between the inner end of this cutaway portion 191 and a shoulder 192 on the pins 183 which the springs surround, so that as soon as the pins come opposite to the cutaway portion of the cam ring they are forced downwardly. When they come in contact with the cam surface 188 they are forced upwardly against the resistance of the spring 190.

The head 183 is retained in position by the nut 193 threaded on the lower end of 178, the operating shaft. On the lower end of the twisting pins 183 are fastened blades 194 which are adapted to be inserted into the slots cut into the surface of the nuts and furnish the means by which the nuts are engaged for effectively twisting them 60°.

It will thus be seen that as soon as the nut is released from engagement with the jaws one of these pins with its knife edge is forced downwardly so that the knife edge is inserted into the slot in the nut. This twisting pin is carried with the twisting head 182 and moves the nut from the position where it was when the insertion was made to the position where it leaves it and the knife edge is withdrawn. This inner movement is sufficient to maintain the nut in the same position that it would have been in if it had traveled normally, being carried by the master wheel so that its relative position with respect to the jaws is maintained, but in the course of this movement it was moved in the arc shown in dotted lines in Fig. 18ª which resulted in the twisting of the nut 60°. At this point the pin is elevated by the cam surface 188, the nut released from its action and the jaws brought into engagement with the nut by reason of the fact that the roller has come in contact with the cam surface on the housing adjacent the rim of the master wheel. Thus each twisting pin comes into engagement in succession with each of the nuts. The movement of the head, and consequently the movement of the pins being driven from a common source, is thus effectively synchronized with the rest of the mechanism.

It will be understood that this cutting, unclamping, twisting and re-clamping is repeated any number of times desired, but in this machine three general groups of operations are provided for cutting three slots in the face of the nut.

By the end of these operations the nut will have traveled approximately 180° from the point at which it was placed on the periphery of the master wheel. The nut will be released by a similar cam to 83 held thereon by a plate 84 coming in contact with the pin 80 and the nut will drop by force of gravity down the chute 195 onto the grating 196, whence the nuts will roll down into a hopper onto an endless belt as a finished product. The oil and chips will drain off through the openings 197 of the grating 196 while the nuts will be conveyed onto the final delivery plate 198 attached to the bottom of this grating.

The oil and chips will be deposited in the area at the bottom of the casting or base of the machine as at 199. The oil will be drawn through the hole 200 in the shoulder 201 while the chips will remain at 199 and be removed by hand from time to time through the door 202, enclosed by the grate 203 hinged at 204. The oil or other lubricant will be removed through the pipe 25. 205 is a guard plate to insure the oil and chips going into the area at 199 and not going directly into the area adjacent the exit pipe for the lubricant so that this exit pipe will not be jammed by metal chips.

206 is a permanent finger for dislodging any nuts which may be stuck on the surface of the master wheel so that they will not be carried around but be positively moved therefrom in case the effect of gravity is not sufficient.

Referring to Figs. 23, 24 and 25, there will be seen a shoulder 207 located on one side of the lagging and adjacent the inner jaw ends of the stationary and sliding jaws. The purpose of this shoulder is to receive the thrust of the broach when cutting the surface of the nut. In the lower face of 207 is a cutaway portion 208. The purpose of this cutaway portion is to permit of any chips being shoved into the cutaway portion so that they will not displace the setting of the nut is position and therefore disturb the accuracy of the cut in the surface of the nut.

In Figures 22 and 26 there will be seen a screw 209. This screw 209 is projected into the body of the turret adjacent the aperture in which the twisting pin travels. A portion of its surface engages with the cutaway portion 210 in the twisting pin. This cutaway portion is flat. This prevents the twisting pin from twisting about on its own axis and insuring that it will travel in a predetermined relationship with the turret.

Figures 5 and 6 illustrate the retaining device to hold the operating wheel in line as it rotates. The roller 211 bears on the wheel 6 and is prevented from turning out of line by the key 212. The lateral adjustment is made by turning in or out the screw 213 which is threaded through the plate 214 and bears against 215 which carries roller 211. The plate 214 is fastened at 216 to side plate 13.

While we have shown and described certain features as constituting our invention, it will be understood that parts have been shown for purposes of illustration only, and that we do not desire to be limited to such details, as obvious modifications will occur to persons skilled in the art.

Having thus fully described our invention, what we claim as new and desire to secure by Letters Patent, is:—

1. A machine of the class described comprising means for supporting and positively locking the work against rotation while locked, means for holding the locking means in locking position, said last mentioned means having a portion permitting the work to be unlocked, means for positively forcing the locking means into said portion to unlock the work, a castellating device for operation on the work, and means to twist the work while unlocked.

2. In combination in a machine for castellating nuts, loading means, a uni-directional moving, conveying and locking means for the work to be operated upon, a cutting broach to act upon the work, means for unlocking the locking means while the work is being twisted, twisting means, means to relock the work for a new cutting operation, and a second cutting means.

3. In combination in a machine for castellating nuts, means to load successive pieces of work upon a conveying means, said piece of work being carried through an arc of a circle, and conveying means for moving the work, a plurality of arcuate cutting means each adapted to take progressively deeper cuts in the work, the arc of each cutting means being located at its forward end further away from the periphery of the conveying means than at its rear end.

4. In combination in a machine for castellating nuts, means to load successive pieces of work upon a conveying means, said piece of work being carried through an arc of a circle, conveying means for moving the work, arcuate cutting means adapted to take progressively deeper cuts in the work, the arc of the cutting means being located at its forward end further away from the periphery of the conveying means than at its rear end, and means for adjusting the position of the work being acted upon at intervals, whereby successive cuts at different angles may be made upon the work by the cutting means.

5. In combination in a machine for castellating nuts, means to load successive pieces of work upon a conveying means, said piece of work being carried through an arc of a circle, conveying means for moving the work, arcuate cutting means adapted to take progressively deeper cuts in the work, the arc of the cutting means being located at its forward end further away from the periphery of the conveying means than at its rear end, means for adjusting the position of the work being acted upon at intervals, whereby successive cuts at different angles may be made upon the work by the cutting means, and means to lubricate the cutting means and the work being acted upon during the cutting operation and means to permit of the removal of the work from the conveying means.

6. In a castellating machine, a supporting means, a master wheel journaled therein, means to actuate said master wheel, loading means for placing nuts in succession on the surface of the master wheel, means for locking said nuts in position individually, a broach located adjacent the periphery of said master wheel to cut a slot in the surface of the nut, and unlocking means for releasing the nut from its locked position so that it can rotate freely on the surface of the master wheel while being carried thereby, a twisting means for twisting said nut, said twisting means being synchronized with the main driving means to turn therewith, means to lock the nut in its new position, additional broaching means, and a means to unlock the nut to allow it to fall from the face of the master wheel, whereby a nut is castellated.

7. In a castellating machine, a supporting means, a master wheel journaled therein, means to actuate said master wheel, loading means for placing nuts in succession on the surface of the master wheel, means for locking said nuts in position individually, a broach located adjacent the periphery of said master wheel to cut a slot in the surface of the nut, an unlocking means for releasing the nut from its locked position so that it can rotate freely on the surface of the master wheel while being carried thereby, a twisting means for twisting said nut, said twisting means being synchronized with the main driving means to turn therewith, means to lock the nut in its new position, additional broaching means, a means to unlock the nut to allow it to fall from the face of the master wheel, and means to lubricate the broaches and the nut during the cutting operation, and means to separate the shavings, oil and nuts from one another after the nuts have been delivered from the master wheel, whereby a nut is castellated.

8. In a castellating machine, a supporting means, a master wheel journaled therein, means to actuate said master wheel, loading means for placing nuts in succession on the surface of the master wheel, means for locking said nuts in position individually, a broach located adjacent the periphery of said master wheel to cut a slot in the surface of the nut, unlocking means for releasing the nut from its locked position so that it can rotate freely on the surface of the master wheel while being carried thereby, a twisting means for twisting said nut, said twisting means being synchronized with the main driving means to turn therewith, means to lock the nut in its new position, additional broaching means, a means to unlock the nut to allow it to fall from the face of the master wheel, and means to synchronize the movement of the master wheel, the loading means and the twisting means, whereby a nut is castellated.

9. In a castellating machine, a supporting means, a master wheel journaled therein, means to actuate said master wheel, loading means for placing nuts in succession on the surface of the master wheel, means for locking said nuts in position individually, a broach located adjacent the periphery of said master wheel to cut a slot in the surface of the nut, and unlocking means for releasing the nut from its locked position so that it can rotate freely on the surface of the master wheel while being carried thereby, a twisting means for twisting said nut, said twisting means being synchronized with the main driving means to turn therewith, means to lock the nut in its new position, additional broaching means, a means to unlock the nut to allow it to fall from the face of the master wheel, means to lubricate the broaches and the nut during the cutting operation, means to separate the shavings, oil and nuts from one another after the nuts have been delivered from the master wheel, and means to synchronize the movement of the master wheel, the loading means and the twisting means, whereby a nut is castellated.

10. In combination in a castellating machine, a supporting frame enclosing a master wheel journaled therein, a master wheel, a plurality of lagging members mounted on the surface of said wheel, a plurality of jaws located on said lagging members, said jaws being located in pairs and one of the jaws being stationary while the other is movable, means on the adjacent supporting frame for moving inwardly and outwardly to predetermined positions each of said movable jaws in succession, means synchronized with the main driving means for the master wheel to insert in the open jaws nuts in succession after which each pair of jaws are clamped on each nut, a plurality of supporting members on said frames carrying broaches, said broaches being located on such an arc as to secure a deeper cut at the end of the broach than at the beginning thereof; a plurality of twisting members located on said frame and driven from the main driving means adapted to twist the nut when temporarily released from engagement with the jaws after each cutting operation and means to finally open the jaws to permit the finished castellated nut to escape from the periphery of the master wheel.

11. In combination in a castellating machine, a supporting frame, a master wheel journaled therein on a master shaft, a power shaft, gearing connecting said power shaft and said master shaft on one side of the frame, detachable gearing on the other end of the master shaft engaging with adjustable gearing to drive a loading mechanism and a twisting mechanism, a loading mechanism, a twisting mechanism, and shafting adapted to be adjusted in position connected to said loading and twisting mechanism, whereby the master wheel, the loading and twisting mechanism will turn as a unit and the speed at which the various members move relative to one another may be varied by an adjustment of the size of the gears.

12. In combination in a castellating machine, a base casting, a pair of parallel spaced upper castings mounted thereon, a master wheel journaled in said base casting and turning between the walls of the base casting and the upper castings, means to drive said master wheel, gearing on one end of the shaft upon which said master wheel is supported, intermediate gearing mounted on one of the upper castings meshing with said gear, a spur gear mounted on the vertical shaft meshing with the second gear, a spur gear on top of said shaft meshing with a spur gear on a horizontal shaft, a horizontal shaft, gearing on either end thereof to drive twisting turrets, twisting turrets mounted on said upper castings in supporting brackets, the faces of the turrets being adjacent the master wheel; a second spur gear meshing with the second driving gear, a horizontal shaft driven therefrom adapted to drive loading mechanism, universal joints in said horizontal shaft and adjustable means for raising and lowering the vertical shaft and moving the driving end of the horizontal shaft simultaneously, whereby when different sizes of the first and second gears are interposed, different speeds of driving the loading mechanism and twisting mechanism may be secured.

13. In combination in a castellating machine, a supporting frame, a master shaft journaled therein, a master wheel mounted thereon, an internal gear carried by said master wheel, a power shaft, gearing to actuate a stub shaft from said power shaft, a pinion on said stub shaft so actuated, said pinion meshing with the internal gear on the master wheel, whereby the master wheel is driven.

14 In a castellating machine, a moving means, a series of stationary and movable jaws in pairs thereon, means to successively open and close said jaws, and means to take the thrust on said nut when it is being broached to relieve the strain on the jaws, whereby nuts may be locked and unlocked between said jaws.

15. In a castellating machine, a master wheel, a plurality of transverse lagging members mounted thereon adjacent to one another with guideways in the face thereof, a stationary jaw member mounted in said guideway, a movable jaw mounted in the other end of said guide way, with the jaws adjacent to one another, a pin projecting upwardly from the outer end of the movable jaw member, a roller journaled on the outer end of the movable member with a portion of its periphery exposed beyond the edge of the master wheel, a cam member suspended in the path of the pin above the lagging and a movable member to move said movable jaw outwardly when the pin comes in contact with the cam member, a second cam member engaging with the roller a portion of its length to maintain said movable jaw in its innermost position and a cutaway portion with a cam surface thereon for permitting the movement outwardly of the movable jaw when the pin and first mentioned cam member actuate the movable jaw, whereby nuts may be locked and unlocked between said jaws.

16. In a castellating machine, a master wheel, a plurality of transverse lagging members mounted thereon adjacent to one another with guideways in the face thereof, a stationary jaw member mounted in said guide way, a movable jaw mounted in the other end of said guide way, with the jaws adjacent to one another, a pin projecting upwardly from the outer end of the movable jaw member, a roller journaled on the outer end of the movable member with a portion of its periphery exposed beyond the edge of the master wheel, a cam member suspended in the path of the pin above the lagging and a movable member to move said movable jaw outwardly when the pin comes in contact with the cam member, a second cam member engaging with the roller a portion of its length to maintain said movable jaw in its innermost position and a cutaway portion with a cam surface thereon for permitting the movement outwardly of the movable jaw when the pin and first mentioned cam member actuate the movable jaw, and means to maintain said master wheel in fixed lateral position as it turns with its shaft in its supporting means and to maintain the plurality of rollers in the plurality of movable jaws in engagement with the second cam member to maintain the jaws and the nuts in locked position, whereby nuts may be locked and unlocked between said jaws.

17. In a loading mechanism, a carrier moved adjacent thereto having a plurality of receptacles for a plurality of pieces of work, means synchronized with the movement of the carrying means to intermittently load in position on the carrier individual pieces of work, means to lock all of the pieces of work to be delivered in fixed position while one piece of work is being placed on the carrier and means to unlock the locking means to allow a new piece of work to be delivered to the carrier, and resilient means on the end of the loading means to securely place said work in position and to absorb the shock of placing the work on the carrying means.

18. In a loading mechanism, a supporting frame, a carrier journaled in said frame having a plurality of retaining means on the face thereof, a bracket mounted on the frame having at the top thereof a cam wheel journaled therein, a pin traveling in said cam adapted to be moved vertically and laterally, an actuating link connected to said pin, a second pin on said actuating link midway thereof traveling in a slot in said supporting bracket, a transverse loading member connected to said link and adapted to be actuated thereby when the cam wheel is rotated, means in said supporting frame to guide said loading member as it reciprocates in a delivery tube adjacent the master wheel, a delivery tube adapted to convey nuts in sequence in the path of the head of said delivery member, whereby nuts in succession may be placed in the retaining means on the surface of the carrier, said carrier and cam wheel being driven synchronously.

19. In a loading mechanism, a supporting frame, a carrier journaled in said frame having a plurality of retaining means on the face thereof, a bracket mounted on the frame having at the top thereof a cam wheel journaled therein, a pin traveling in said cam adapted to be moved vertically and laterally, an actuating link connected to said pin, a second pin on said actuating link midway thereof traveling in a slot in said supporting bracket, a transverse loading member connected to said link and adapted to be actuated thereby when the cam wheel is rotated, means in said supporting frame to guide said loading member as it reciprocates in a delivery tube adjacent the master wheel, a delivery tube adapted to convey nuts in sequence in the path of the head of said delivery member, whereby nuts in succession may be placed in the retaining means on the surface of the carrier, said carrier and cam wheel being driven synchronously, and a resilient member on the head of said loading member to absorb the shock thereof and to insure the definite placing of the nuts on the surface of the master wheel.

20. In a loading mechanism, a supporting frame, a carrier journaled in said frame having a plurality of retaining means on the face thereof, a bracket mounted on the frame having at the top thereof a cam wheel journaled therein, a pin traveling in said cam adapted to be moved vertically and laterally, an actuating link connected to said pin, a second pin on said actuating link midway thereof traveling in a slot in said supporting bracket, a transverse loading member connected to said link and adapted to be actuated thereby when the cam wheel is rotated, means in said supporting frame to guide said loading member as it reciprocates in a delivery tube adjacent the master wheel, a delivery tube adapted to convey nuts in sequence in the path of the head of said delivery member, whereby nuts in succession may be placed in the retaining means on the surface of the carrier, said carrier and cam wheel being driven synchronously, a locking member pivoted on the delivery tube, a pin engaging with the lower end of the locking member, said pin being carried on the delivery member, whereby as the delivery member is thrust inwardly to deliver a nut to the master wheel, the next nut in order in the delivery tube is released from the lock and is allowed to drop in position when the delivery member is withdrawn from the re-delivery of the succeeding nut.

21. In a loading mechanism, a supporting frame, a carrier journaled in said frame having a plurality of retaining means on the face thereof, a bracket mounted on the frame having at the top thereof a cam wheel journaled therein, a pin traveling in said cam adapted to be moved vertically and laterally, an actuating link connected to said pin, a second pin on said actuating link midway thereof traveling in a slot in said supporting bracket, a transverse loading member connected to said link and adapted to be actuated thereby when the cam wheel is rotated, means in said supporting frame to guide said loading member as it reciprocates in a delivery tube adjacent the master wheel, a delivery tube adapted to convey nuts in sequence in the path of the head of said delivery member, whereby nuts in succession may be placed in the retaining means on the surface of the carrier, said carrier and cam wheel being driven synchronously, a locking member pivoted on the delivery tube, a pin engaging with the lower end of the locking member, said pin being carried on the delivery member, whereby as the delivery member is thrust inwardly to deliver a nut to the master wheel, the next nut in order in the delivery tube is released from the lock and is allowed to drop in position when the delivery member is withdrawn from the re-delivery of the succeeding nut, and means to lock said nut on the face of the master wheel.

22. In a loading mechanism, a supporting frame, a carrier journaled in said frame having a plurality of retaining means on the face thereof, a bracket mounted on the frame having at the top thereof a cam wheel journaled therein, a pin traveling in said cam adapted to be moved vertically and laterally, an actuating link connected to said pin, a second pin on said actuating link midway thereof traveling in a slot in said supporting bracket, a transverse loading member connected to said link and adapted to be actuated thereby when the cam wheel is rotated, means in said supporting frame to guide said loading member as it reciprocates in a delivery tube adjacent the master wheel, a delivery tube adapted to convey nuts in sequence in the path of the head of said delivery member, whereby nuts in succession may be placed in the retaining means on the surface of the carrier, said carrier and cam wheel being driven synchronously, a locking member pivoted on the delivery tube, a pin engaging with the lower end of the locking member, said pin being carried on the delivery member, whereby as the delivery member is thrust inwardly to deliver a nut to the master wheel, the next nut in order in the delivery tube is released from the lock and is allowed to drop in position when the delivery member is withdrawn from the re-delivery of the succeeding nut, and means on the cam wheel for regulating the movement of the cam wheel.

23. In a machine for castellating nuts, a pair of supporting arches mounted on a supporting frame, a member carried by said arches consisting of an L-shaped member, a second member parallel to the first mentioned member, and means on the arch for supporting said members in engagement with one another, and a broach carried therebetween.

24. In a machine for castellating nuts, a pair of supporting arches mounted on a supporting frame, a member carried by said arches consisting of an L-shaped member, a second member parallel to the first mentioned member, means on the arch for supporting said members in engagement with one another, a broach carried therebetween, said broach having sloping ends converging towards one another at the bottom thereof, an end plate connected to the members for supporting one end of said broach in a cut-away inner portion of the end plate, a second plate at the other end thereof with a set screw for jamming the end of said broach to thrust the broach against the other end plate.

25. In a machine for castellating nuts, a pair of supporting arches mounted on a supporting frame, a member carried by said arches consisting of an L-shaped member, a second member parallel to the first mentioned member, means on the arch for supporting said members in engagement with one another, a broach carried therebetween, said broach having sloping ends converging towards one another at the bottom thereof, an end plate connected to the members for supporting one end of said broach in a cutaway inner portion of the end plate, a second plate at the other end thereof with a set screw for jamming the end of said broach to thrust the broach against the other end plate, and means to adjust said broach vertically carried in the members.

26. In a machine for castellating nuts, a pair of supporting arches mounted on a supporting frame, a member carried by said arches consisting of an L-shaped member, a second member parallel to the first mentioned member, means on the arch for supporting said members in engagement with one another, a broach carried therebetween, said broach having sloping ends converging towards one another at the bottom thereof, an end plate connected to the members for supporting one end of said broach in a cutaway inner portion of the end plate, a second plate at the other end thereof with a set screw for jamming the end of said broach to thrust the broach against the other end plate, means to adjust said broach vertically carried in the members, and means to adjust vertically and separately in the separate arches the individual members with the broach.

27. In a machine for castellating nuts, a pair of arch shaped transverse bridges, having a cutaway portion in the crown of their arches, an L-shaped longitudinal member fitted in said cutaway portions having a horizontal and a vertical portion, a second transverse member having a vertical portion parallel to the first, a broach carried therebetween, the inner faces of said longitudinal members having alternate cutaway portions, means to space said broach from the longitudinal members, means on the longitudinal members to support said broach at either end thereof, means supported by the arches to hold the second longitudinal member against the broach to maintain the broach in its fixed position, and a passage way for the passage of lubricant through one of the longitudinal members communicating with the space on top of the broach and the cutaway portions on the inner faces of the longitudinal members, whereby the broach may be lubricated.

28. In a machine for castellating nuts, a pair of transverse arches, a pair of longitudinal members carried in the bottom of said arches, means of adjustably suspending said longitudinal members in said arches, a broach carried between said longitudinal members and spaced therefrom at the top of the broach, means of adjusting the space between the top of the broach and the longitudinal members, means of supporting one end of the broach attached to the longitudinal members, means of adjustably engaging the other end of the broach, said broach having its teeth closer to the top thereof at the forward end than at the rear end, whereby the progressive cut of the broach may be adjusted.

29. In a machine for castellating nuts, a pair of transverse arches, a pair of longitudinal members carried in the bottom of said arches, means of adjustably suspending said longitudinal members in said arches, a broach carried between said longitudinal members and spaced therefrom at the top of the broach, means of adjusting the space between the top of the broach and the longitudinal members, means of supporting one end of the broach attached to the longitudinal members, means of adjustably engaging the other end of the broach, said broach having its teeth closer to the top thereof at the forward end than at the rear end, whereby the progressive cut of the broach may be adjusted, alternate cutaway portions on the inner faces of the longitudinal members adjacent the broach communicating with the space between the top of the broach and the longitudinal members and means of delivering lubricant to said space on the top of the broach whereby all portions of the broach will be lubricated.

30. In a machine for castellating nuts, a pair of transverse arches, a pair of longitudinal members carried in the bottom of said arches, means of adjustably suspending said longitudinal members in said arches, a broach carried between said longitudinal members and spaced therefrom at the top of the broach, means of adjusting the space between the top of the broach and the longitudinal members, means of supporting one end of the broach attached to the longitudinal members, means of adjustably engaging the other end of the broach, said broach having its teeth closer to the top thereof at the forward end than at the rear end, whereby the progressive cut of the broach may be adjusted, alternate cutaway portions on the inner faces of the longitudinal members adjacent the broach communicating with the space between the top of the broach and the longitudinal members and means of delivering lubricant to said space on the top of the broach whereby all portions of the broach will be lubricated, and means at either end of the space at the top of the broach for delivering or removing lubricant therefrom.

31. In a machine for castellating nuts, a twisting mechanism consisting of a driving mechanism, a driven shaft, a turret connected to said driven shaft, a plurality of twisting pins carried in the head of said turret adapted to move vertically therein and rotate therewith, a cam member held nuts move relatively to one another, said conveyor being arranged to move the nuts in a circular path and said broaches having arcuate cutting edges.

41. In a machine for castellating nuts, means for loading the nuts on a conveyor, broaching means, means for moving the broaching means and nuts relatively to one another, means for readjusting the position of the nuts after each broaching operation, whereby the nuts will be broached at different angles as the broaching means and the nuts move relatively to one another, said conveyor being arranged to move the nuts in a circular path and said broaches having arcuate cutting edges, the broaching means being arranged to progressively cut nuts during the relative movement.

42. In a machine for castellating nuts, means for locating the nuts on a conveyor which moves the nuts in a circular path adjacent broaches, broaches, means for locking the nuts in position before broaching and during the broaching operation, and means for unlocking the nuts after broaching and relocking them in a new position for another broaching operation, and means for unloading the nuts from the conveyor after all the broaching operations have been completed.

In testimony whereof, we affix our signatures.

FRANK MOESCHL.
GEORGE N. STARK.
ARTHUR V. REGAN.

stationary adjacent to said turret member, said cam member being cutaway a portion of its length and adapted to engage in cutaway portions in each of said pins, whereby said pins are alternately elevated and depressed as they turn with said turret adjacent said cam member.

32. In a machine for castellating nuts, a twisting mechanism consisting of a driving mechanism, a driven shaft, a turret connected to said driven shaft, a plurality of twisting pins carried in the head of said turret adapted to move vertically therein and rotate therewith, a cam member held stationary adjacent to said turret member, said cam member being cut away a portion of its length and adapted to engage in cutaway portions in each of said pins, whereby said pins are alternately elevated and depressed as they turn with said turret adjacent said cam member, and means to force said pins outwardly as they come opposite to the cutaway portion of said cam member, said pins being adapted to engage with slots in the surface of pieces of work to be acted upon.

33. In combination in a machine for castellating nuts, a twisting mechanism, consisting of a driving means, a turret driven therefrom, a plurality of twisting pins adapted to move vertically therein, having means on the lower ends thereof for insertion in slots in pieces of work to be twisted, a master wheel adapted to carry pieces of work turning in synchronism with said turret, a fixed cam member having a cutaway portion adapted to elevate each of said pins in succession, and to permit of the expulsion of said pins in succession, resilient means to force outwardly said pins to engage with the work, whereby work carried on the master wheel will be twisted in position while being carried on the wheel without losing its relative position on the surface of the master wheel.

34. In combination in a machine for castellating nuts, a twisting mechanism consisting of a driving means, a turret driven therefrom, a plurality of twisting pins adapted to move vertically therein, having means on the lower ends thereof for insertion in slots in pieces of work to be twisted, a master wheel adapted to carry pieces of work turning in synchronism with said turret, a fixed cam member having a cutaway portion adapted to elevate each of said pins in succession, and to permit of the expulsion of said pins in succession, resilient means to force outwardly said pins to engage with the work, and means for unlocking and locking said nut after the twisting operation, whereby work carried on the master wheel will be twisted in position while being carried on the wheel without losing its relative position on the surface of the master wheel.

35. In a machine for castellating nuts, twisting mechanism consisting of a bracket, driving mechanism mounted therein, vertical driven mechanism driven therefrom and mounted in the bracket, a turret suspended on the lower end of said driven mechanism, a plurality of twisting pins adapted to reciprocate in said turret, said pins having heads traveling in cutaway portions in said turret, a helical spring surrounding said springs between said turret and said heads on the pin, a knife plate on the head of each of said pins, a cam member stationarily supported by said bracket on a sleeve surrounding the driven member adapted to engage with each of said pins in succession to raise and permit of the lowering of said pins, whereby the pins engaging pieces of work in succession will twist said work from one position to another.

36. In a machine for castellating nuts, means to move a nut in an arc, means to rotate said nut on its own axis and bodily in an arc away from and back to the horizontal plane of its original travel and transversely thereof, said movements being synchronized so that the return position of the nut is the same position it would have occupied if it had continued to travel in the original arc at a predetermined speed.

37. In a machine for castellating nuts, the combination of a base casting supporting a master wheel, means for delivering nuts falling from said master wheel to a grating, a grating to drain oil and chips from said nuts, a receptacle below said grating for receiving said oil and chips, a baffle plate to direct said oil and chips to the proper receptacle, and means for permitting said oil to escape free from said chips to be returned to the lubricating system.

38. In a machine for castellating nuts, means for conveying the nut adjacent to a broach, a broach for broaching the nut, means to twist the nut to a new position for another broaching operation, whereby the nut is castellated by being broached at different angles.

39. In a machine for castellating nuts, means for loading the nuts on a conveyor, broaching means, means for moving the broaching means and nuts relatively to one another, means for readjusting the position of the nuts after each broaching operation whereby the nuts will be broached at different angles as the broaching means and the nuts move relatively to one another.

40. In a machine for castellating nuts, means for loading the nuts on a conveyor, broaching means, means for moving the broaching means and nuts relatively to one another, means for readjusting the position of the nuts after each broaching operation, whereby the nuts will be broached at different angles as the broaching means and the